July 18, 1939. W. C. SCHUKNECHT ET AL 2,166,448
HOSE PROTECTOR
Filed Nov. 19, 1937   2 Sheets-Sheet 1

INVENTORS
WALTER C. SCHUKNECHT
BY GEORGE N. JAGEMANN
ATTORNEY.

July 18, 1939.   W. C. SCHUKNECHT ET AL   2,166,448
HOSE PROTECTOR
Filed Nov. 19, 1937   2 Sheets-Sheet 2

INVENTORS
WALTER C. SCHUKNECHT
BY GEORGE N. JAGEMANN
Andrew R. Woolfolk
ATTORNEY.

Patented July 18, 1939

2,166,448

UNITED STATES PATENT OFFICE 2,166,448

HOSE PROTECTOR

Walter C. Schuknecht and George N. Jagemann, Manitowoc, Wis., assignors to Eastman Manufacturing Company, Manitowoc, Wis.

Application November 19, 1937, Serial No. 175,402

1 Claim. (Cl. 138—61)

This invention relates to a coupling construction and is particularly directed to a construction for protecting that part of the hose adjacent the coupling to prevent too sharp bending and cutting of the hose.

In its broadest aspects, this invention is not limited to a hose coupling and guard construction, but embraces any coupling or rigid connecting member from which a flexible member such as a cable extends, though the invention is primarily directed to a hose coupling and guard construction.

Objects of this invention are to provide a novel form of hose coupling and guard construction in which the hose guard, which may take the form of a helical spring, is interlocked with the coupling in a novel manner to prevent either longitudinal or rotary detachment of the spring guard from the coupling.

In greater detail, objects of this invention are to provide a construction of combined hose guard and coupling in which the hose guard may be attached to the coupling in a very simple manner without requiring any threading of the coupling for the reception of the helical hose guard, in which the hose guard may be slipped over the coupling and may be forced into place by a longitudinal motion, the invention, however, not being limited to this mode of assembly as it also comprehends the assembling of the hose guard by either a direct axial motion or by a rotary motion, such hose guard snapping into interlocking relation with the coupling in an automatic manner when in its correct relative position and thereafter preventing detachment of the parts and guarding against the possibility of pulling the hose guard off or turning or screwing the hose guard off by relative rotary motion between the hose guard and the coupling.

Further objects of this invention are to provide a hose coupling which may be made with a material reduction in the cost of manufacture and which, as stated, does not require the cutting of a spiral for the hose guard as in some forms of devices it is difficult if not impossible to cut a spiral.

In greater detail, objects of this invention are to provide a coupling construction in which the coupling member is provided with a projecting portion, preferably cylindrical, which encloses a portion of the hose and which is itself enclosed by a part of the hose guard, such projecting portion being provided with a continuous annular flange in one form of the invention and an interrupted annular flange in another form of the invention, in both forms providing a groove or recess rearwardly of the flange into which the end convolution of the hose guard fits.

Embodiments of the invention are shown in the accompanying drawings, in which.

Figure 1:
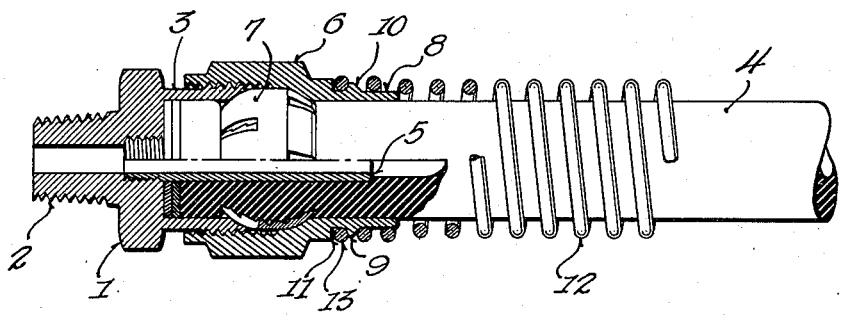
Figure 1 is a fragmentary view of the end of a hose with the coupling and hose guard applied thereon, the coupling and a portion of the hose being shown in section.
Figure 2:
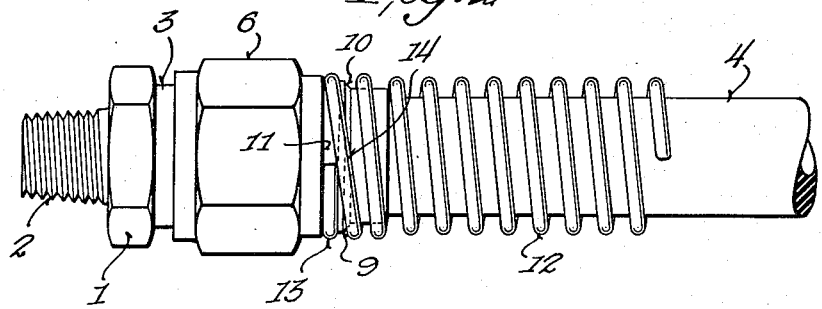
Figure 2 is a view of the construction shown in Figure 1 as it appears from the outside without sectioning through the coupling.

Referring to the drawings, particularly Figures 1 and 2, the hose coupling may comprise a body portion 1 provided with either male or female means for attachment to a pipe or other fitting, the male attaching means being chosen for the sake of illustration, and being indicated by the reference character 2.

This body portion is provided with an externally threaded shell 3 which receives the end of the hose 4 and is further provided with an internal nipple 5 which extends into the hose. It is provided with a clamping nut 6 which clamps and compresses the compressible gripping shell 7 which bites into the hose and forces the hose into binding abutment at its end with the body portion and locks the hose in place to the coupling. This type of coupling is a renewable coupling, but the invention, as will be apparent as the description proceeds, is not limited solely to a renewable coupling.

The clamping nut 6 is provided with a cylindrical or other shaped extension 8 which projects a slight distance over the hose and is provided with a continuous annular flange 9, the outer side of which is provided with a bevelled or tapered face 10.

Rearwardly of the flange the nut 6 is provided with a shoulder 11 which forms, with the flange, a groove adapted to receive the end convolution of the helical spring hose guard 12.

The hose guard 12 is preferably formed of resilient material and may be an ordinary helical spring. It is preferably provided with a flattened end convolution indicated at 13 which fits behind the flange 9 and in abutting relation with the shoulder 10.

In assembling the hose guard it is first slipped over the hose and then the coupling is attached. Thereafter the hose guard is merely forced onto the cylindrical portion 8 of the coupling, the end convolution 13 of the hose guard riding over the cam shaped or bevelled outer face 10 of the continuous annular flange 9 and snapping into place rearwardly of such flange as shown in Figures 1 and 2.

A peculiar action takes place with this type of hose guard and coupling construction for when it is attempted to rotate the hose guard in a clockwise direction, as viewed in Figure 2, it will be found that the hose guard cannot be detached from the flange 9 as the end convolution merely rides around the rear portion of the flange 9. The slanting connecting portion indicated at 14 in Figure 2 at most would tend to creep upwardly across the flange but is prevented from doing so by the abutment of the end convolution 13 with the shouldered portion 11 of the nut 6. Reverse rotation is prevented for the hose guard clamps tightly against the coupling and will not permit reverse rotation. Consequently the hose guard cannot be detached from the coupling by a rotary or unscrewing motion nor can it be pulled longitudinally from the coupling.

Additionally it is to be seen that the coupling can be formed on an ordinary screw machine without cutting any threads on its external surface. The annular ring is a much simpler manufacturing proposition than a threaded exterior would have been. Additionally the secure interlocking of the hose guard with the coupling against both rotary or longitudinal detachment is secured by the novel action hereinabove described.

Figure 3:
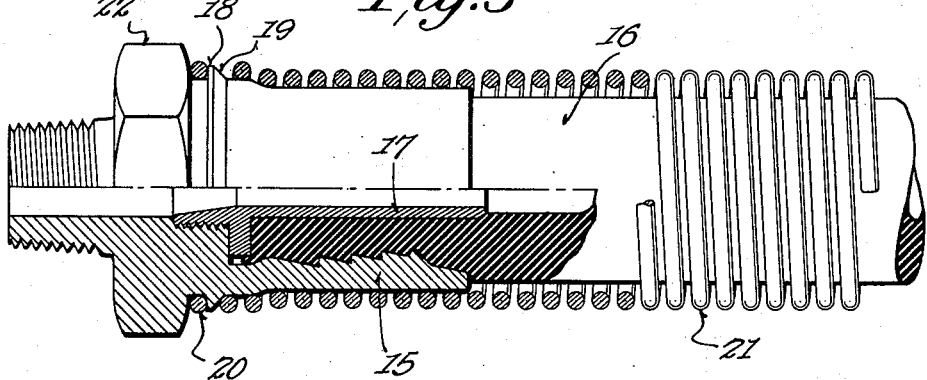
Figure 3 is a view corresponding approximately to Figure 1 and showing a modified form of construction.

It is obvious that this invention is not limited to a hose guard for a renewable type coupling as described hereinabove, but is equally applicable to a coupling which is permanently applied to the hose as by contracting the outer shell 15 upon the hose 16, as shown in Figure 3, a suitable internal nipple 17 being provided to prevent collapsing of the hose. In this form of the invention the same construction is employed for retaining the interlocking relation between the hose guard and the coupling. For instance, the coupling is provided with the continuous annular flange 18 which has a bevelled outer surface 19 and an abrupt inner surface. If desired, the end convolution 20 of the hose guard 21 may have a flat end as previously described. Also this end convolution may fit against the bottom of a hexagonal portion 22 of the coupling as shown. At all events an abrupt shoulder is formed to prevent the further entry of the hose coupling into the hose guard.

The portion 15 is preferably cylindrical as this is the customary way in which it would be shaped after passing through a die, and in assembling the hose guard on the coupling it is merely forced up over the coupling after the coupling has been compressed onto the hose. The end convolution 20 of the hose guard rides over the cam face 19 and snaps back of the flange 18.

The rear face of the flange 18 of Figure 3 or the flange 9 of Figure 1 may be either flat, as shown in Figure 3, or rounded as shown in Figure 1. However, the forward face of the flange indicated at 19 in Figure 3 and at 10 in Figure 1 is cam shaped or bevelled to temporarily expand the end convolution of the resilient hose guard so that it will ride up over the flange and snap into place back of the flange.

Figure 4:
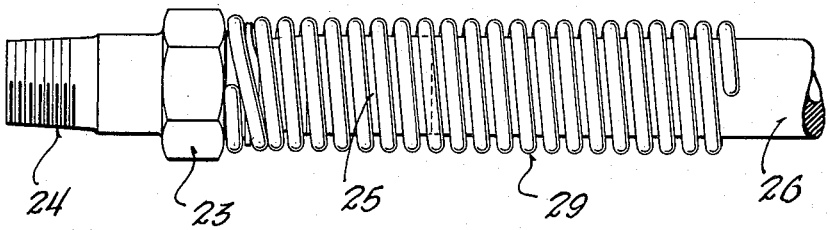
Figure 4 is a view of a further form of the invention, showing an interrupted annular locking flange.
Figure 5:
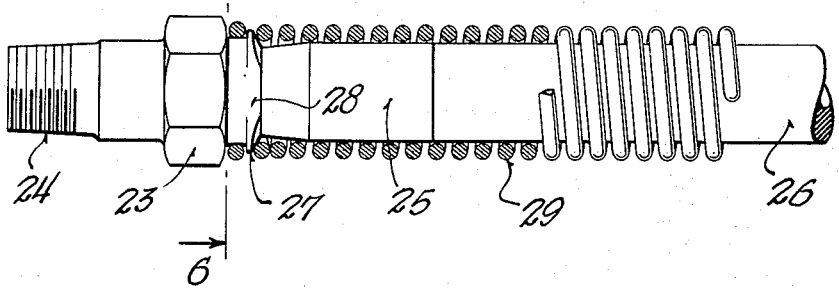
Figure 5 is a view of the structure shown in Figure 4 with a part of the hose guard in section.
Figure 6:
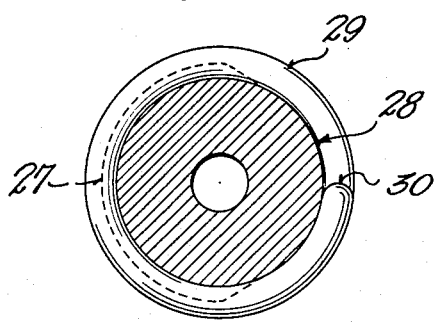
Figure 6 is an enlarged sectional view on the line 6—6 of Figure 5.

In the form of the invention shown in Figures 4, 5 and 6, it will be seen that the construction includes a hose guard which may comprise the polygonal portion 23 having either a male member 24, as shown, or a female member and which has the shell like portion 25 contracted on the hose 26. This shell like portion is provided with an interrupted annular flange 27. The flange 27 extends part way around the body of the coupling, as shown most clearly in Figures 5 and 6, and is interrupted at the portion 28.

The hose guard comprises the helical member 29 similar to that previously described and it may have the end convolution flattened, as shown most clearly in Figure 4, if so desired. Further the end of the hose guard is preferably slightly rounded in all of the forms of the invention and as indicated at 30 in the enlarged view of Figure 6.

In this form of the invention the hose guard may be assembled with the end convolution located back of the retaining interrupted annular flange 27 by either forcing the hose guard onto the coupling or else by giving the hose guard a rotary motion with the end of the spiral passing into the space 28 between the ends of the flange 27. After the hose guard is positioned, it cannot be removed by a direct longitudinal pull, nor can it be removed by a rotary motion. If it is attempted to turn the hose guard in a clockwise direction, as viewed in Figure 4, the second convolution will merely ride up over the flange and again snap into the space 28 when it arrives at such space. On the other hand, if it is attempted to rotate the hose guard in the reverse direction, then the hose guard clamps on the coupling and prevents rotary motion in that direction. It is thus impossible to remove the hose guard by either a longitudinal pull of any reasonable extent or by attempting to rotate it in either direction.

In all forms of the invention it is to be noted that an extension is provided which projects outwardly beyond the annular retaining ring for the hose guard. The extension is indicated by the reference characters 8, 15 and 25 in the different forms of the invention. This extension fits within the spring hose guard and thus prevents lateral flexing of the spiral spring guard adjacent its end convolution. In this manner it is impossible to so laterally flex the spring guard as to pull it free of the annular retaining ring whether this ring is of the continuous or of the discontinuous type. If this extension were omitted, the flexible hose would not be sufficient to prevent lateral deflection of the spring guard by the bodily bending of the hose and the spring guard laterally and consequently it is an essential requirement, as shown in the drawings, that the extension be formed as a rigid portion of the coupling itself to prevent lateral deflection of the spring guard.

While the invention has been described as primarily applicable to hose couplings, it is obvious that nevertheless it may be applied to any other type of coupling member which has a cable or other flexible member projecting therefrom, though the invention is primarily directed to a hose guard and coupling construction.

In all forms of the invention, it is to be noted that the coupling has a cylindrical extension of one diameter and has a second cylindrical portion of a greater diameter, and these two cylindrical portions are separated by an annular flange, the annular flange being either continuous or interrupted.

By having the second cylindrical portion of larger diameter than the rigid cylindrical extension, it is apparent that the helical spring guard will be caused to grip tightly upon the second cylindrical extension back of the annular flange, and consequently when the helical spring guard is rotated in a reverse or unscrewing direction, the end convolution, which already grips the larger diameter, second cylindrical portion, will have a certain frictional drag which will cause the end convolution to tighten its grip due to the winding up action thereof and will thereby prevent reverse or unscrewing rotation of the helical spring guard. It would be undesirable to have this tight grip throughout the entire extent of the first cylindrical extension, for it would be difficult to get the helical spring guard in place under these conditions, but by having the larger diameter located at the end convolution, that is to say, at the second cylindrical portion, it is apparent that the helical spring guard may be passed relatively freely over the cylindrical extension and will be caused to grip tightly upon the second cylindrical portion.

In actual tests of this device such results have been obtained and a very effective grip is thereby secured in a simple and expeditious manner without hampering or interfering with the free assembling of the spring guard and the coupling.

The invention is particularly useful under conditions where it is either substantially impossible or actually impossible to cut the spiral in the body of the coupling in any commercial quantity production work. Additionally, it is apparent that in automatic screw machine work it is a much cheaper operation to merely form an annular flange than it is to cut a spiral groove for the reception of the hose guard.

This invention, therefore, provides a construction which utilizes the annular flange and obtains a secure retention of the hose guard on the coupling though avoiding the necessity of the extensive spiral cut.

Further than this, the assembly of the parts is extremely simple, the resilient hose guard being merely forced into place on the coupling or rotated into place and thereafter automatically locking itself against either longitudinal or rotary detachment.

The expression "annular flange" is intended to cover either a continuous flange, an interrupted flange, or any other radially projecting member.

Although this invention has been described in considerable detail, it is to be understood that such description is intended as illustrative rather that limiting, as the invention may be variously embodied and is to be interpreted as claimed.

We claim:

In a device of the class described, a flexible member, a coupling secured to said flexible member and having a portion projecting over said flexible member and forming a rigid cylindrical extension, said coupling having a second cylindrical portion located inwardly of said cylindrical extension and of larger diameter than said cylindrical extension, said coupling having an annular flange between said second cylindrical portion and said cylindrical extension, and a helical spring guard extending over said cylindrical extension and over said second cylindrical portion and having an end convolution located rearwardly of said flange and tightly gripping said second cylindrical portion, said second cylindrical portion being of such increased size as to provide for tight engagement between said portion and said end convolution while leaving the remainder of said guard freely movable on said cylindrical extension and flexible member.

WALTER C. SCHUKNECHT.
GEORGE N. JAGEMANN.